Feb. 25, 1941.    F. A. NICHOLSON    2,233,219
TIMBER SUPPORTING AND POSITIONING DEVICE
Filed April 25, 1938    9 Sheets-Sheet 2
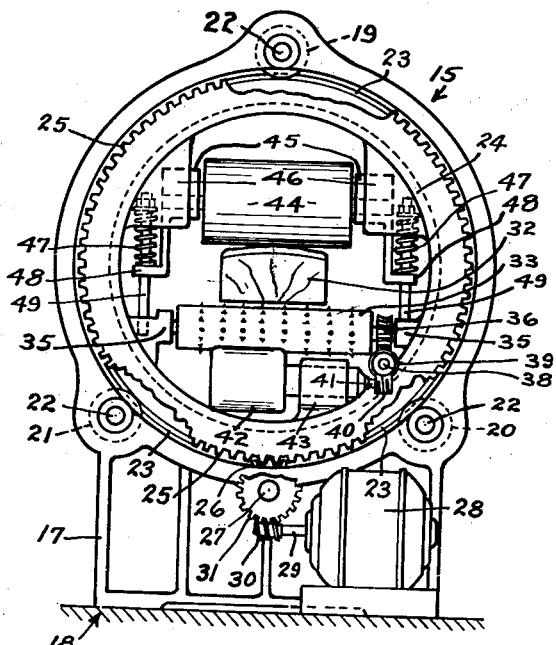
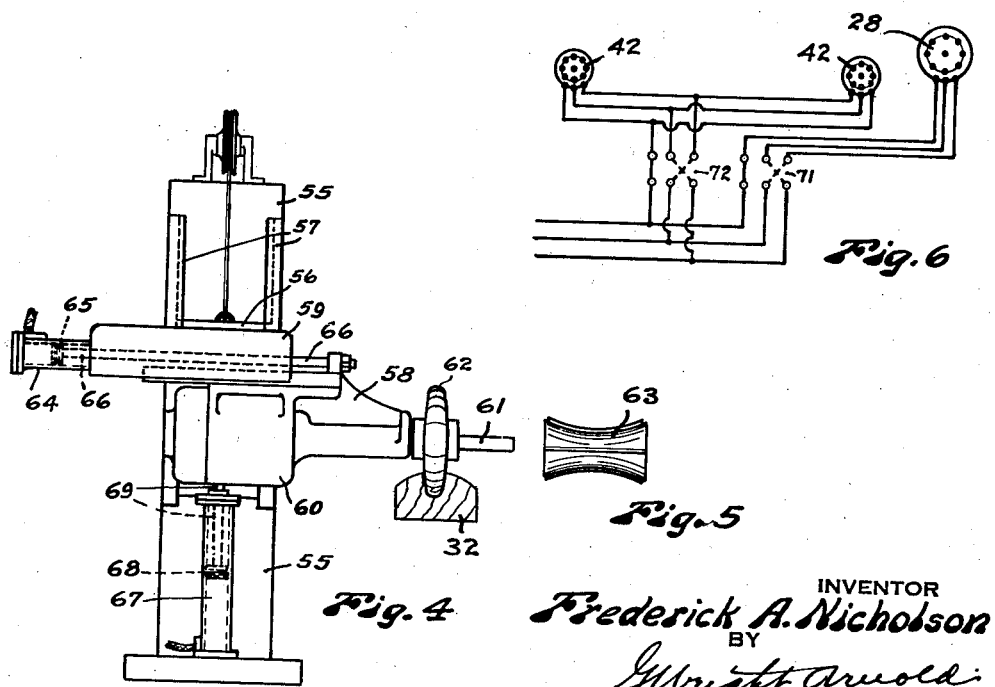
INVENTOR
Frederick A. Nicholson
BY
G. Wright Arnold
ATTORNEY

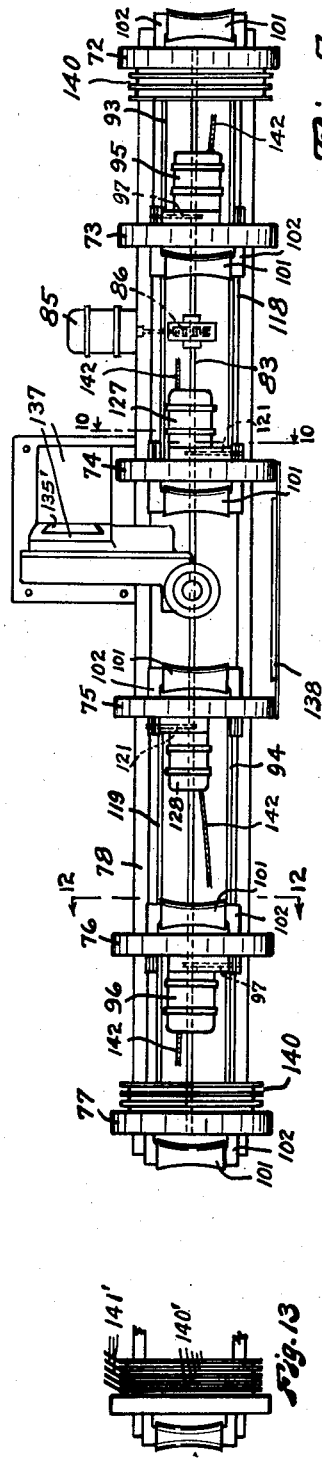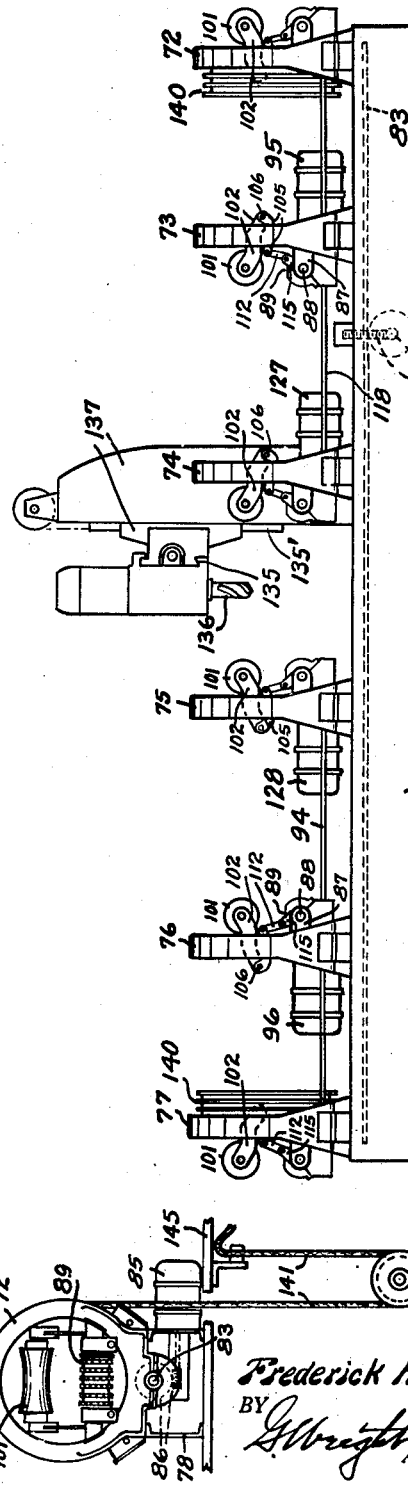

Feb. 25, 1941.  F. A. NICHOLSON  2,233,219
TIMBER SUPPORTING AND POSITIONING DEVICE
Filed April 25, 1938  9 Sheets-Sheet 4

INVENTOR
Frederick A. Nicholson
BY
G. Wright Arnold
ATTORNEY

Feb. 25, 1941. F. A. NICHOLSON 2,233,219
TIMBER SUPPORTING AND POSITIONING DEVICE
Filed April 25, 1938 9 Sheets-Sheet 5
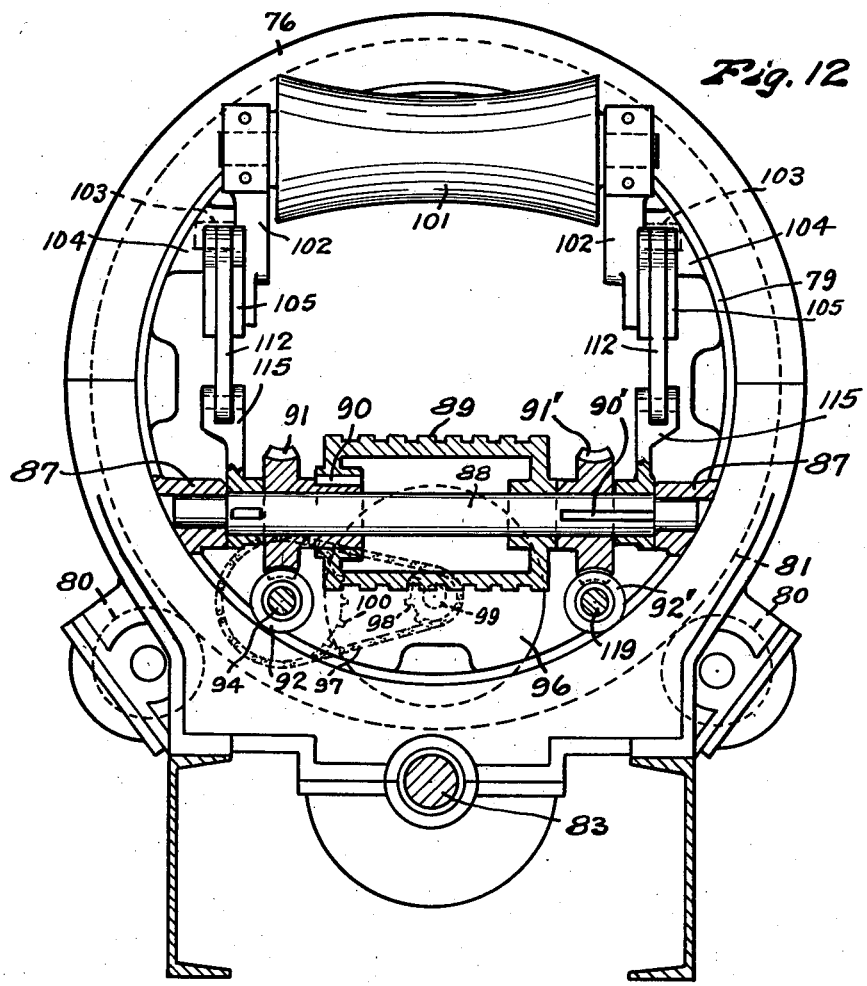
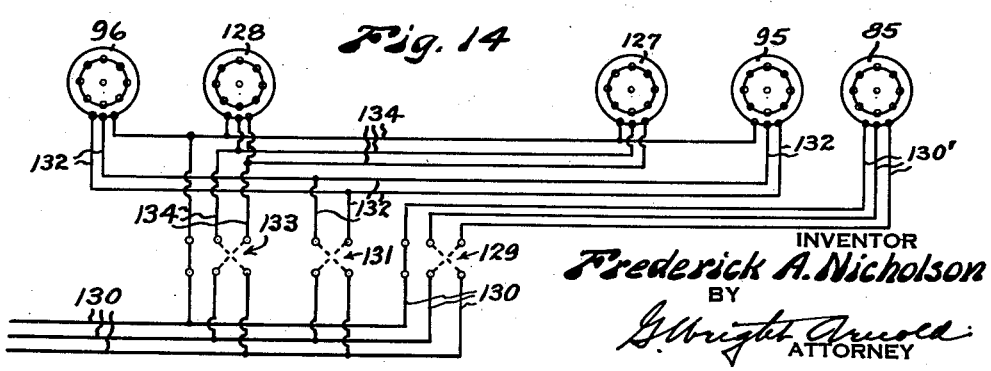
INVENTOR
Frederick A. Nicholson
BY
G. Wright Arnold
ATTORNEY

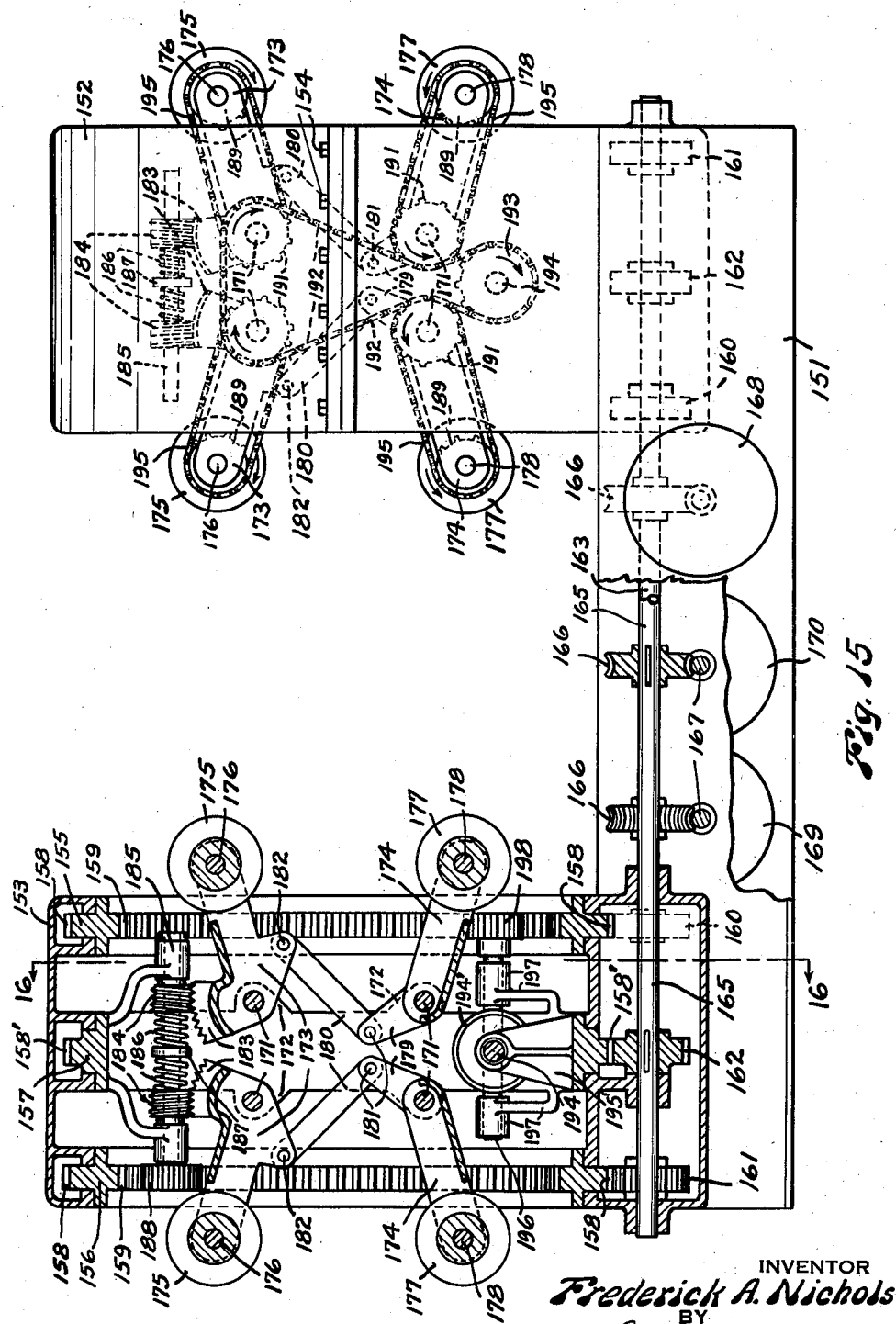

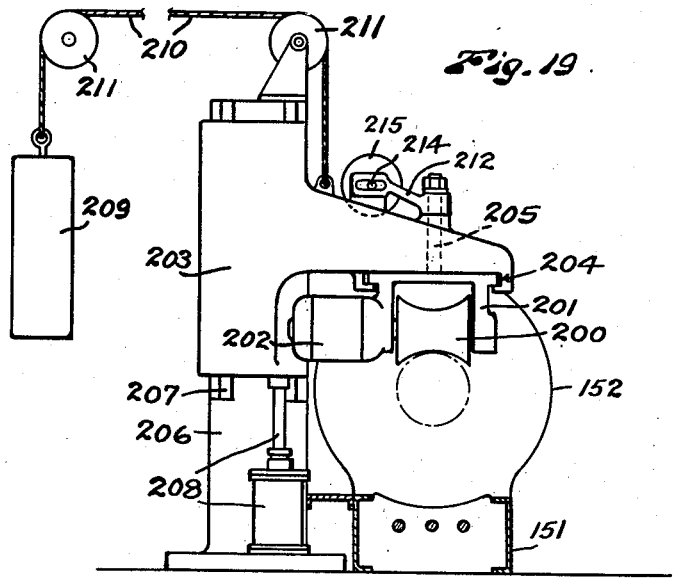
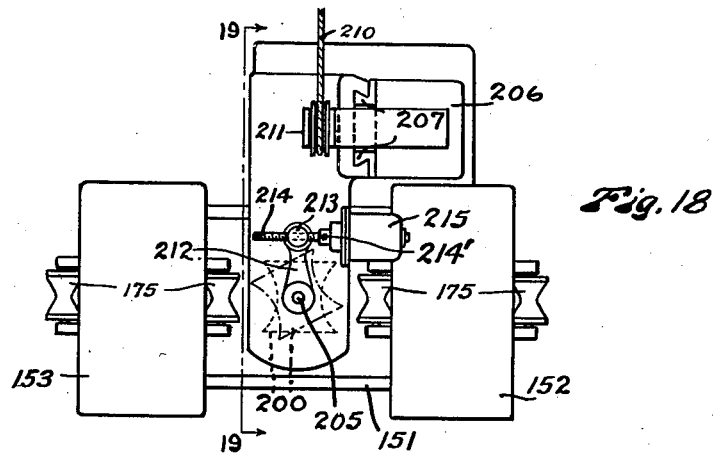

Patented Feb. 25, 1941

2,233,219

UNITED STATES PATENT OFFICE 2,233,219

TIMBER SUPPORTING AND POSITIONING DEVICE

Frederick A. Nicholson, Seattle, Wash., assignor to Stetson-Ross Machine Company, Seattle, Wash., a corporation of Washington Application April 25, 1938, Serial No. 204,071

11 Claims. (Cl. 144—242)

This invention relates to supporting and positioning devices for pieces of timber and the primary object of this invention is to provide reliable and efficient devices for supporting and longitudinally and rotatively moving a slab, a log, a cant or a similar piece of timber which is being worked on.

In preparing wood for use in the manufacture of pulp it is desirable to remove bark, knots, and undesirable portions from the slabs or logs or cants from which the pulp is to be made. This work is best done by the use of driven tools which bore out or rout out or cut away the undesirable parts. To attain speed of operation and properly present the pieces of wood to the tools it is desirable to support these pieces of wood in such a manner that they may be moved longitudinally in either direction and may be turned or rotatively moved into any desired position relative to the tool. This invention provides means for supporting the pieces of wood and moving them rotatively and longitudinally relative to a tool in such a manner that high speed operation may be obtained and the work done very efficiently.

A primary object of this invention is to provide supporting and positioning devices for pieces of timber embodying a plurality of axially aligned spaced apart ring members carrying timber holding and feeding means and having devices connected therewith for rotatively moving said ring members to thereby angularly position the piece of timber carried by the holding and feeding means.

Another primary object of the invention is to provide efficient driving and control means for the timber holding and positioning means whereby a piece of timber may be moved longitudinally and rotatively at the same time, either while it is being worked on by a tool or to position it for application of the tool thereto.

The above mentioned general objects of this invention, together with others inherent in the same, are attained by the mechanism illustrated in the following drawings, the same being preferred exemplary forms of embodiment of this invention, throughout which drawings like reference numerals indicate like parts:

Fig. 3 is an end elevation of the machine shown in Figs. 1 and 2, the boring tool being omitted;

Fig. 4 is an elevation of a rotary tool which is adapted for use in connection with this turning machine for removing knots, and undesirable portions or for hogging off bark from pieces of wood held in this machine;

Fig. 5 is a detached view of a barking head which may be used on the tool shown in Fig. 4;

Fig. 6 is a simplified wiring diagram showing a control means for the motors shown in Figs. 1, 2 and 3;

Fig. 7 is a plan view of a modified form of turning and feeding machine constructed in accordance with this invention, showing a boring and routing tool in connection therewith;

Fig. 8 is a side elevation of the device shown in Fig. 7, the shield 138 not being shown in the interest of clearness;

Fig. 9 is an end elevation of the device shown in Figs. 7 and 8, the shield 138 not being shown in the interest of clearness;

Fig. 12 is a sectional view on a larger scale than Fig. 7, taken substantially on broken line 12—12 of Fig. 7;

Fig. 13 is a fragmentary view illustrating alternative means for supplying electrical energy to the motors shown in Figs. 7 to 12 and 14.

Fig. 14 is a simplified wiring diagram showing the control means for the motors embodied in Figs. 7 to 13;

Fig. 15 is a view partly in side elevation and partly in vertical section of another modified form of the invention which is adapted for use in holding and angularly and longitudinally moving pieces of timber of substantially cylindrical shape;

Fig. 18 is a plan view showing a bark removing tool applied to the machine shown in Figs. 15–17;

Fig. 19 is a view partly in elevation and partly in section taken substantially on broken line 19—19 of Fig. 18.

Figure 1:
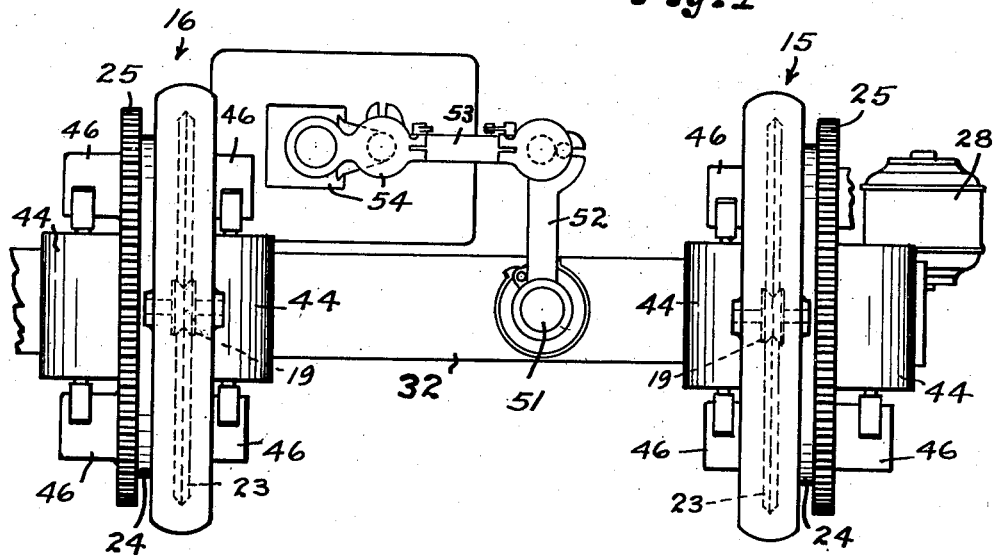
Figure 1 is a plan view of a turning and feeding machine constructed in accordance with this invention, showing a boring tool in connection therewith.
Figure 2:
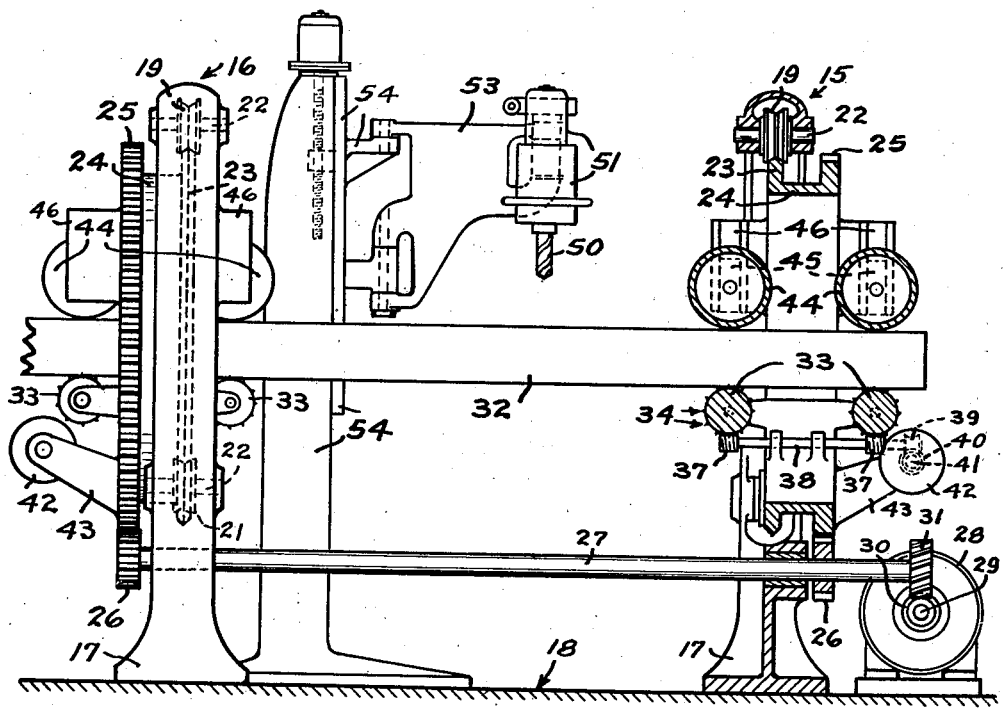
Fig. 2 is a view partly in side elevation and partly in vertical section of the same.

Figs. 1, 2 and 3 disclose one form of the invention. In these figures the numerals 15 and 16 indicate generally two circular frame members provided with base portions 17 resting upon and secured to any suitable support 18. The two circular frame members 15 and 16 are of substantially duplicate construction and the mechanism associated with these two frame members is of substantially duplicate construction. For this reason the same reference numerals and description apply equally well in connection with either of said frame members.

Each frame member 15 and 16 supports three grooved rollers 19, 20 and 21, which are rotatably mounted on suitable bearing means 22 and preferably positioned substantially as shown in Fig. 3. Each set of rollers 19, 20 and 21, receives and supports a circular track 23 on the outer circumferential portion of a ring member 24. This supports each ring member 24 for rotary movement in either direction within the frame 15 and 16.

Each ring member 24 is externally provided with an integral gearwheel 25. Each gearwheel 25 meshes with a pinion 26 on a shaft 27, which is common to the two frames 15 and 16. The two gearwheels 25 are preferably of the same size and the two pinions 26 are preferably of the same size so that the two ring members 24 will always be angularly moved equal amounts by rotation of the shaft 27. The shaft 27 is driven by a reversible motor 28, having a shaft 29 provided with a worm 30, which meshes with a worm wheel 31 on the shaft 27.

The mechanism used in connection with each ring member 24 for receiving and holding, and longitudinally moving slabs or pieces of wood 32, which are to be worked on, comprises two lower rolls 33, having peripheral spikes or ridges 34 thereon, and two upper rolls 44. Each lower roll 33 is journaled in bearing means 35, provided in the corresponding ring member 24 and each roll 33 is provided with a worm wheel 36, which meshes with a worm 37 on a shaft 38. Each shaft 38 has a driving connection by means of a worm wheel 39 and worm 40 with the shaft 41 of a reversible motor 42. Each motor 42 is mounted on a bracket 43, which is secured to the corresponding ring member 24. The two upper rolls 44 are positioned above the lower rolls 33. The upper rolls 44 are journaled in bearing blocks 45, which are movable vertically in guides 46. Springs 47, Fig. 3, rest upon brackets 48, which extend downwardly from the bearing blocks 45, and exert a resilient downward pressure on the bearing blocks 45, thus keeping the rolls 44 pressed firmly against any slab 32 of wood which is supported between the rolls 33 and 44. Rods 49 are connected with the ring members 24, and cooperate in supporting the springs 47.

In this description the rolls 33 and 44 have been referred to respectively as lower rolls and upper rolls. Such description refers to positions as shown in the drawings. It will be understood, however, that rotation of the ring members 24 may turn the rolls and other parts connected with the ring members into any angular position throughout a complete circle.

Any desired form of tool or machine may be used to bore out, rout out, hog off, or otherwise operate on the slab of wood 32, held by the rolls 33 and 44. In Figs. 1 and 2 there is shown one such machine comprising a boring or routing tool 50, driven by a motor 51, supported on pivotally connected bracket arms 52 and 53. The bracket arms 52 and 53 are connected with a frame means 54, by suitable mechanism, not herein described in detail, which permits them to be moved vertically to feed the tools 50 to the work. The two arms 52 and 53 permit the tool to be moved crosswise and lengthwise of the slab 32 into substantially any desired position within the limits of movement permitted by said arms 52 and 53. The tool 50 is especially well adapted for boring out knots and other undesirable parts of the wood.

In Figs. 4 and 5, there is shown another type of machine, for cutting away wood or bark, which may be used in connection with this turning and feeding device. This machine is located for operation on the slab of wood 32 between the two ring members 15 and 16. This machine may supplant or work in conjunction with the tool or machine 50—54 shown in Figs. 1 and 2 and above described. This machine consists of an upright frame 55, having a vertically movable carriage 56, supported thereon by guide means 57. A horizontally movable carriage 58 is supported in the vertically movable carriage 56 by guide means 59. A motor 60, having a horizontal shaft 61 is carried by the horizontally movable carriage 58. Any suitable tool of cutter head type may be carried by the motor shaft 61, as for instance the narrow cutter tool 62, shown on said shaft 61 in Fig. 4, or a wider barker head type tool 63, shown detached in Fig. 5. The tool 62 may be used to form grooves to remove undesirable portions in a slab 32, where a groove or a narrow cut is required to remove the undesirable part. The tool 63 is useful to remove bark or surface defects from the rounded side of a slab 32 of wood. Preferably a hydraulic cylinder 64, having a piston 65 therein connected by a rod 66 with the horizontally movable carriage 58, is provided for moving the horizontal carriage 58 and a similar cylinder 67, provided with a piston 68 connected by a rod 69 with the vertically movable carriage 56, is provided for vertically moving the carriages 56 and 58. Suitable means, not shown, by which the operator may control the inlet and exhaust of fluid from the cylinders 64 and 67 is provided.

In the use of this machine, preferably an operator is positioned at the side of the machine opposite the tool which is used for cutting away or removing the wood. Positioned within easy reach of this operator are two reversing switches 71 and 72, shown diagrammatically in Fig. 6. The reversing switch 71 is connected in the circuit of the motor 28 and the reversing switch 72 is connected in the circuit with the two motors 42. The two motors 42 operate at the same speed and are connected in parallel, so that they will always start, stop and reverse simultaneously.

In the operation of the device, the operator starts the motors 42, so as to drive the rolls 33 in a desired direction, and a slab 32 is fed between the rolls 33 and 44 at one end of the machine. As soon as the end of this slab is within range of the cutting tool, it may be worked on to remove undesirable portions of the wood. The slab is positioned longitudinally by the motors 42, which drive the rolls 33, and is positioned angularly by the motor 28, which drives the shaft 27 and rotates the ring members 24 in either direction as desired. When the ring members 24 are rotated, the slab is turned on its longitudinal axis so that any side or face of the same may be properly positioned to be worked on by the tool. After a slab has been entered between the rolls 33 and 44, at one end of the machine and advanced far enough, it will pass between the rolls 33 and 44 at the other end of the machine and will be supported between both sets of rolls until the trailing end of said slab passes beyond the first set of rolls, after which the slab is held by the second set of rolls, while a trailing end portion thereof is being worked on. The two lower rolls 33 of each set and the two upper rolls 44 of each set are longitudinally spaced apart far enough so that the rolls at one end of the machine will support a slab firmly while the end portions of said slab are being worked on.

In Figs. 7 to 14, inclusive, there is shown a modified form of the invention adapted for holding and angularly positioning and longitudinally moving a relatively long slab or piece of wood. This device comprises six spaced apart circular frame members 72, 73, 74, 75, 76 and 77, mounted on two longitudinally extending parallel base members 78. Each frame member 72 to 77 inclusive, has a circular ring member 79 (see Fig. 11) rotatively mounted therein. These ring members 79 are supported on rollers 80 (Figs. 10 and 12) which are engaged by an external circular track 81 on the ring members.

An external gear 82 is integral or rigidly connected with each ring member 79. A shaft 83, which may extend the full length of the machine, is provided for driving the ring members 79 and suitable spur gears 84, on this shaft 83, mesh with the respective gear wheels 82. The shaft 83 is driven by a motor 85, having a driving connection with said shaft 83, through worm and worm wheel devices 86, or an equivalent driving means, see Figs. 7 and 8.

Figure 10:
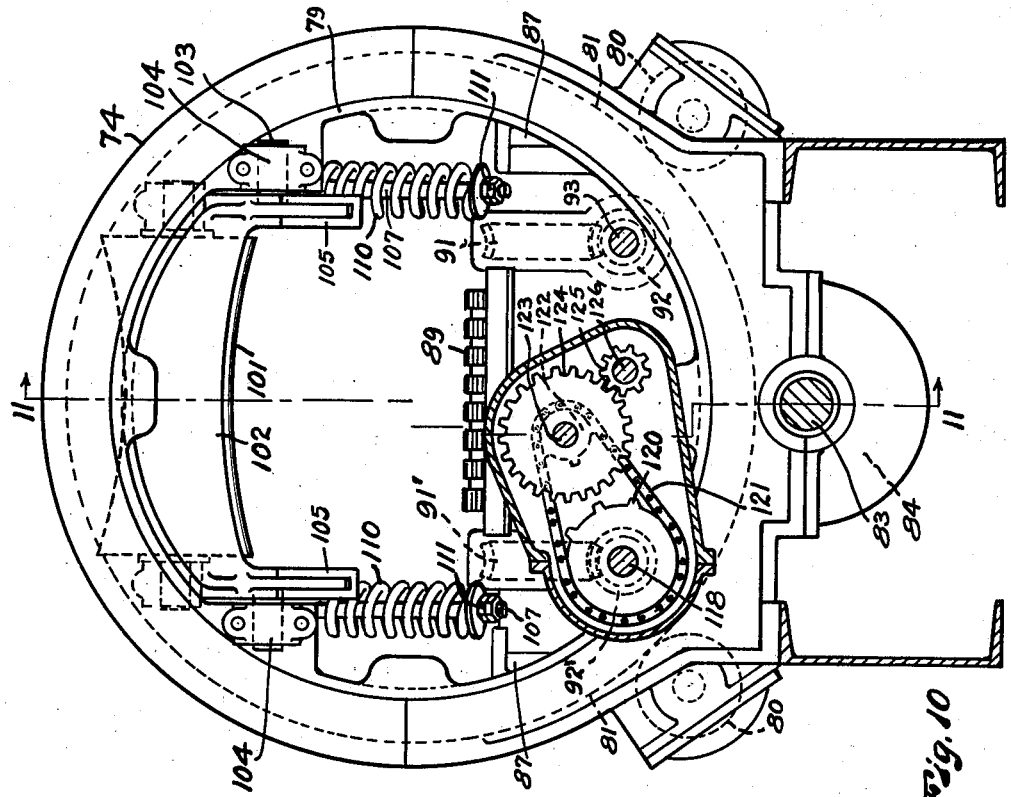
Fig. 10 is a sectional view, on a larger scale, substantially on broken line 10—10 of Fig. 7, parts being shown in elevation, the shield 138 not being shown in the interest of clearness.
Figure 11:
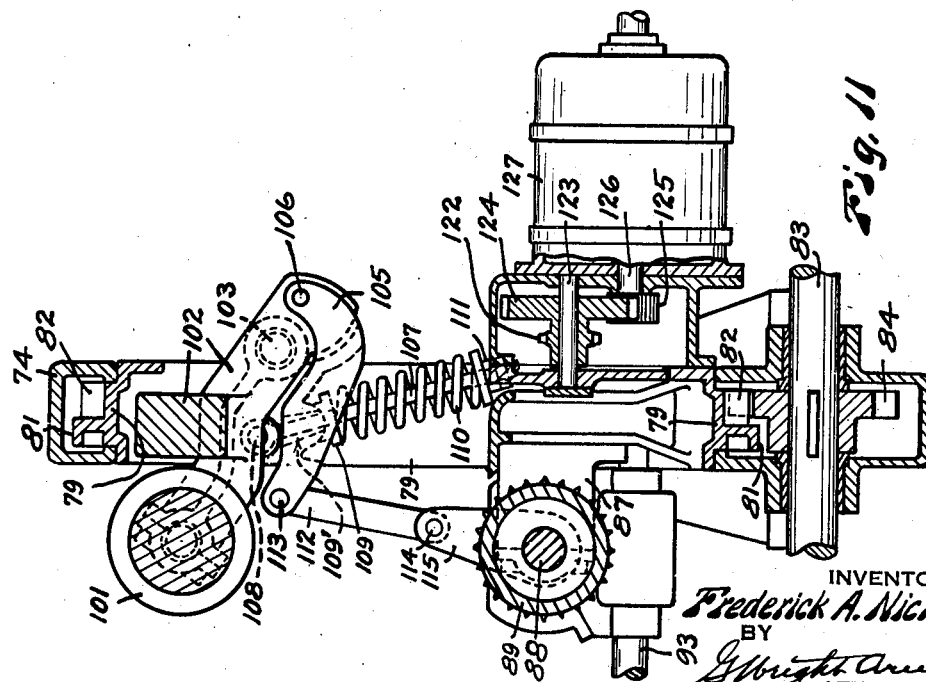
Fig. 11 is a fragmentary sectional view, with parts in elevation, taken substantially on broken line 11—11 of Fig. 10.

Each ring member is internally provided in its lower portion, as shown in Figs. 10, 11 and 12, with bearing bracket means 87, in which a shaft 88 is mounted for oscillation. A lower roll 89 is rotatably mounted on each shaft 88. Each roll 89 is fixedly connected, as by a key 90, Fig. 12, with the hub portion of a worm wheel 91. Each worm wheel 91 meshes with a worm 92, by which the worm wheel 91 and roll 89 are driven. The worms 92, which are associated with the three circular frames 72, 73 and 74 at one end of the machine, are mounted on a shaft 93, Figs. 7 and 10, and the corresponding worms which are associated with the three circular frames 75, 76 and 77, at the other end of the machine, are mounted on a similar shaft 94, see Fig. 7. The space between the two medial circular frames 74 and 75 is used as an operating station and, as the ring members 79, and parts connected therewith, including the shafts 93 and 94, must be angularly moved through an angle of 180° or more, to properly present the work to a boring or routing or bark removing tool, it is desirable to avoid extending, across this operating station, any shafts or other parts which might collide with, or interfere with, the operation of the tools. For this reason, the two shafts 93 and 94 are used instead of using one shaft. Two motors 95 and 96 are provided for driving the shafts 93 and 94 respectively. Each motor 95 and 96 is preferably connected with its respective shaft by a link belt 97, operatively connecting a small sprocket wheel 98 on the motor shaft 99 with a larger sprocket wheel 100 on the shaft 93 or 94. This driving connection between the shaft 99 of motor 95 and the shaft 94 is shown by dotted lines in Fig. 12, and is somewhat diagrammatically shown by dotted lines in Fig. 7. The control means for motors 95 and 96, hereinafter explained, is such as to always insure the driving of the shafts 93 and 94 so as to rotate the rolls 89 in the same direction and at the same speed.

An upper roll 101 is also carried by each ring member 79, in a position substantially opposite the corresponding lower roll 89. The upper rolls 101 are preferably of the concave type, being of larger diameter at the ends and smaller diameter midway between the ends so as to better fit the rounded side of a slab cut from the exterior of a cylindrical log. The upper rolls are each rotatably mounted in a U shaped bracket 102, which is provided with outwardly projecting pivot studs 103, supported for oscillation in bearings 104 in the ring member 79, with which the bracket is associated.

Each arm of each bracket 102 has a secondary bracket arm 105 (Fig. 11) pivotally connected therewith by pivot means 106. The pivot means 106 is positioned at the end of the bracket arm 102, opposite the upper roll 101, and the secondary bracket arm 105 extends toward the roll 101, underneath the bracket arm 102. Each secondary bracket arm 105 is further connected with its corresponding main bracket arm 102 by resilient means consisting of an eye bolt member 107, connected by pivot means 108 with the main bracket arm 102, and extending in a generally downward direction through a hole 109' in arm 105 and through a rocker member 109, which is pivotally connected with the secondary bracket arm. A compression spring 110 is provided on each eye bolt 107 below each secondary bracket arm 105. One end of each compression spring 110 presses against the rocker member 109 of the adjacent secondary bracket arm 105, and the other end of said spring 110 is supported by washer and nut means 111 on the end portion of the eye bolt 107. By this arrangement, the force of the spring 110 is exerted to urge the two bracket arms 102 and 105 together and to yieldingly resist separation of said two bracket arms. Thus if an upper roll 101 contacts a slab of wood, the spring 107 may compress and the two arms 102 and 105 may move apart providing a resilient mounting for the rolls 101. The means for raising and lowering the rolls 101 is connected with the end portions of the secondary bracket arms 105, remote from the pivots 106. This means comprises a link 112, having one end portion connected by a pivot 113 with each secondary bracket arm 105. The other end portion of each link 112 is connected by a pivot 114 with a lever arm 115 on the transverse shaft 88, on which the adjacent roll 89 is mounted. Obviously oscillating the shaft 88 will tend to raise and lower the upper roll 101 with which it is connected. Two shafts 118 and 119, Figs. 7, 10 and 12, extending longitudinally of the machine, are provided for raising and lowering the upper rolls 101. The shaft 118 controls the movement of the upper rolls 101, associated with the three circular frames 72, 73 and 74 at one side of the station where the work is done on the slab or piece of wood, and the shaft 119 controls like movement of the rolls 101, associated with circular frames 75, 76 and 77 at the other side of the work station. Shaft 119, see Fig. 12, is operatively connected with each shaft 88 by a worm 92' meshing with a worm wheel 91' connected by a key 90' with the shaft 88, whereby shaft 88 may be oscillated. Shaft 118 is similarly connected with its shafts 88, see Fig. 10. The driving means for the shaft 118, see Figs. 10 and 11, consists of a sprocket wheel 120 connected by a link belt 121 with a smaller sprocket wheel 122 on a countershaft 123. A gearwheel 124, on the countershaft 123, meshes with a pinion 125 on the shaft 126 of a reversible motor 127. The driving means for the shaft 119 consists of similar link belt and gear mechanism, not shown, connecting said shaft 119 with a reversible motor 128.

The control means for the motors 85, 95, 96, 127 and 128 is diagrammatically shown in Fig. 14. This control consists of three independent reversing switches, namely, one reversing switch 129 connecting a source of energy 130 with the circuit wires 130′, which control the supply of electric current to the motor 85; another reversing switch 131 connecting the source of energy 130 with the circuit wires 132, which control the supply of electric current to the two motors 95 and 96, and another reversing switch 133 connecting the source of energy 130 with the circuit wires 134, which control the supply of electric current to the two motors 127 and 128.

The routing tool 136 is movable horizontally on track 135 and vertically on track 135′, by means not shown, so that the routing tool can move up and down and at right angles to the direction of travel of the log or timber being worked on.

Fig. 7 shows a transparent shield 138, positioned between the tool 136 and the location where the operator stands to protect the operator against flying chips.

In connection with a machine of this type for holding and angularly turning and longitudinally positioning slabs or pieces of wood, it has been found desirable to have a plurality of motors connected with the holding and turning means in such a manner that said motors are moved with the holding and turning means. As these parts are turned back and forth at frequent intervals during operation through angles up to at least 180°, considerable difficulty has been encountered due to breakage of the electrical conductor cables which are connected with the motors. This difficulty has been overcome by providing, on two of the oscillatory ring members 97, such as the ring members positioned in circular frames 72 and 77 at the ends of the machine, winding drums 140, on which the electric cables 141 are wound. The cables 141 provide a plurality of conductors such as conductors 132 and 134 shown diagrammatically in Fig. 14. Preferably a separate groove is provided in each winding drum 140, for each cable used. See Figs. 7 and 8. The cables 141, preferably conducted from the motors to the winding drums 140 through suitable conduits 142, Fig. 7, are wound one or more turns on the drums and thence pass around sheaves 143, Fig. 9, to which counterweight means 144 is attached, whereby the slack is taken out of the cables. Beyond the sheaves 143, the cables 141 are clamped or otherwise secured to any convenient support 145. This arrangement avoids all twisting and all sharp bending of the cables and greatly reduces cable deterioration.

Fig. 13 shows alternative means for completing the electrical connections to the motors 95, 96, 127 and 128, which are carried on the angularly movable rings shown in Figs. 7 to 12. This alternative means comprises slip rings 140′, carried by the rings in the frames 72 and 77, only one set of said slip rings being shown. Brushes 141′ engage with said slip rings to supply current thereto and the slip rings are connected with the motors by suitable cables, not shown, which may be disposed in conduits similar to the conduits 142, shown in Fig. 7. When these slip rings 140′ and brushes 141′ are used, they will be interposed in the conductors 132 and 134, shown diagrammatically in Fig. 14.

In the operation of the machine disclosed in Figs. 7 to 14 inclusive, the operator stands at the side of the machine and operates the machine by manipulation of the control devices 129, 131, and 133. Slabs, or pieces of wood, are supplied to one end of the machine by any suitable means, not shown. The operator may raise the top rolls 101 to receive these slabs or pieces of wood, or said slabs or pieces may be fed into the rolls and raise the top rolls 101 by pressure which compresses the springs 110. The operator advances or retracts the slabs at will by driving the lower rolls 89, and thereby positions the slabs longitudinally with respect to the boring or routing or bark removing tool. At the same time the operator positions the slabs angularly with respect to the tool by energizing motor 85 and turning the ring members 79 in either desired direction. When the slab is properly positioned for removing an undesirable portion thereof, such as a knot, the operator lowers the tool onto said undesirable portion and bores or routs it out of the slab. The slabs are firmly held so that they may be worked on throughout their entire length as they pass through the machine and all undesirable parts removed.

Figs. 15 to 20, inclusive, disclose another modified form of the invention which is especially well adapted for the handling of round logs and in which all of the rolls are driven. Also, in this machine, the upper and lower rolls are interconnected for movement toward and away from each other.

Figure 16:
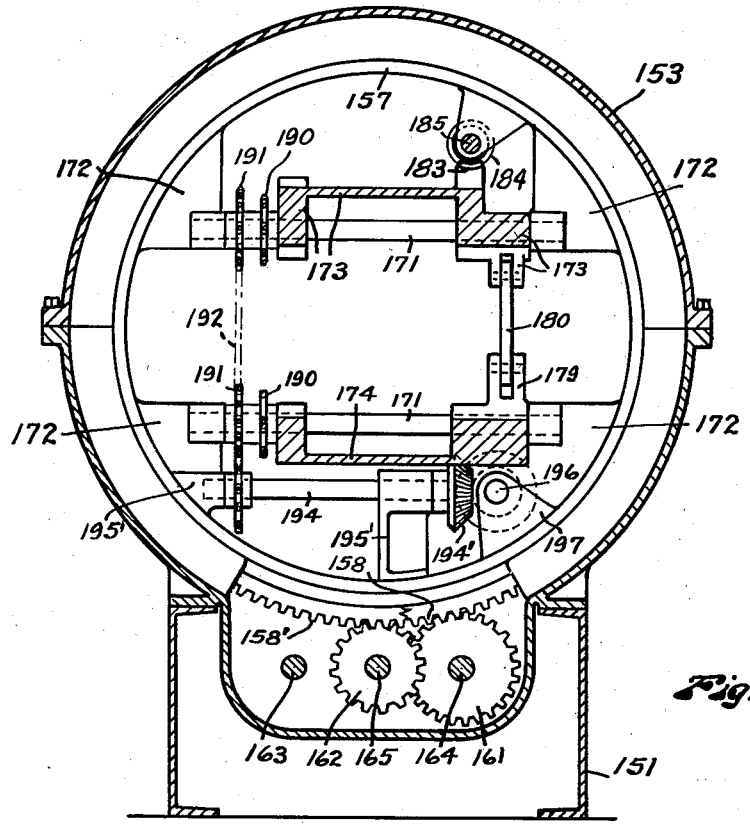
Fig. 16 is a sectional view substantially on broken line 16—16 of Fig. 15.
Figure 17:
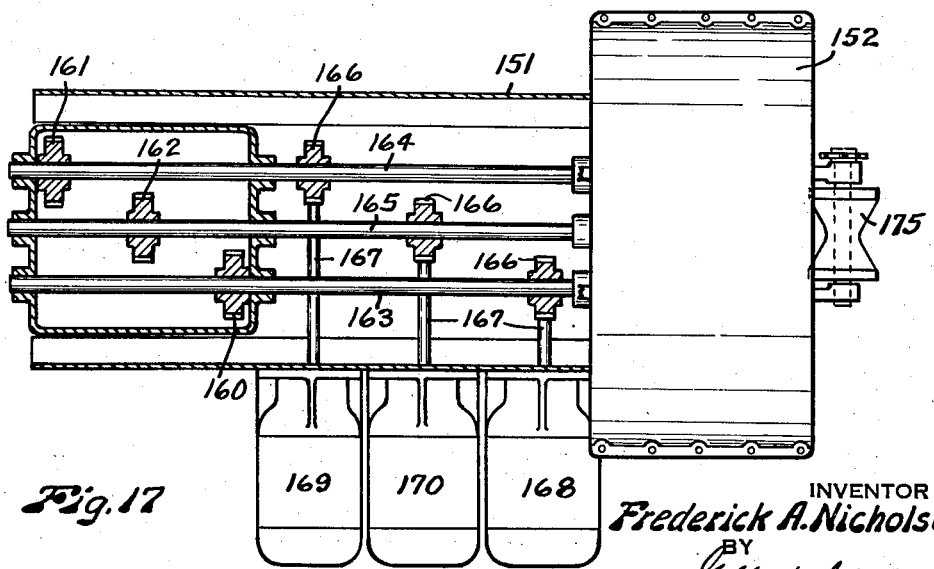
Fig. 17 is a view partly in plan and partly in horizontal section of the machine shown in Figs. 15 and 16, said Fig. 17 being on a smaller scale than Figs. 15 and 16.

Referring to Figs. 15, 16 and 17, numeral 151 designates base means upon which two circular housing members 152 and 153 are rigidly mounted in spaced apart relation, to provide space therebetween for using a bark removing tool or the like on a log or piece of wood held in the machine. Each circular housing member 152 and 153 preferably consists of an upper half and a lower half secured together by cap screws 154. Disposed within each of the circular housing members 152 and 153 are three rotatively mounted ring members 155, 156 and 157. The ring members 155 and 156 each have external gears 158 and internal gears 159, and the ring member 157 has an external gear 158′. The external gears of the ring members 155, 156 and 157, within each circular housing, mesh with gearwheels 160, 161 and 162 respectively, which are positioned below said ring members. In Fig. 15, the gearwheel 160 is shown by dot and dash lines, as it would not appear in the sectional portion of that view. The gearwheels 160, 161 and 162 are mounted on shafts 163, 164 and 165 respectively, see Fig. 17. These shafts are positioned alongside of each other in the base portion of the machine and extend throughout the length of the machine. The shafts 163, 164 and 165 are respectively connected by worm and worm wheel means 166 with the shafts 167 of motors 168, 169 and 170. The gear ratios of the several worms, worm wheels and gear wheels between the motors 168, 169 and 170 and the respective ring members 155, 156 and 157 driven by said motors, is such as to cause said ring members to all be rotated at the same speed when all of the motors are driven in the same direction and at the same speed. The several motors 168, 169 and 170 are electrically connected so that whenever the motor 170 is energized, the motors 168 and 169 will be energized therewith and will run in the same direction and at the same speed. Also, the motors 168 and 169 may be operated independently of the motor 170, and the motors 168 and 169 may be operated independently of each other. The electrical connections to said motors are hereinafter described.

Four transverse shafts 171, arranged in rectangular formation, extend across each ring member 157, and are mounted in brackets 172, which are integral with the ring member. Two upper bracket members 173 and two lower bracket members 174 are fulcrumed on the shafts 171. Two upper rolls 175 are rotatably mounted in the outer end portions of the upper bracket members 173, of each ring member 157, by axle means 176. Two lower rolls 177 are rotatably mounted in the outer end portions of the lower bracket members 174, of each ring member 157, by axle means 178. Two lever arms 179 are fixedly connected with the lower bracket members 174 of each ring member. Each of two diagonal links 180 has one end connected by pivot means 181 with the lever arms 179, and the other end connected by pivot means 182 with the upper bracket members 173. These links 180 and lever arms 179 thus interconnect oppositely positioned brackets for angular movement so that the rolls supported thereby will be simultaneously moved equal distances toward each other, or away from each other. This provides for keeping a log or piece of timber, which is held by said rolls, in a substantially axial position as respects the ring members 157 and circular housing members 152 and 153. It will be understood that the terms upper and lower, as applied to brackets, rolls and the like in this description, refer to the parts which are shown uppermost in the drawings, but as this machine is a rotary type machine, the position of these parts may be altered or even reversed in operation. The means for moving the rolls 175 and 177 comprises two worm wheel segments 183 rigid with the upper bracket members 173. Two worms 184 are splined on a shaft 185, and mesh with the respective segments 183. One of these worms is a right hand and the other a left hand thread, whereby rotation of the shaft 185 will move the brackets 173 in opposite angular directions. Angular movement of brackets 173 will move brackets 174 in opposite angular directions with the result that the two rolls 175 and the two rolls 177 will be moved toward or away from each other. The inner ends of the worms 184 engage with compression springs 186, which press against a fixed collar or flange 187, on the shaft 185, so that the rolls 175 and 177 will be resiliently supported. Rotation of the worms 184 in one direction will move the rolls 175 and 177 toward each other while rotation of said worms in a reverse direction will move said two pairs of rolls apart. If, in moving the rolls 175 and 177 toward each other, the shaft 185 and worms 184 continue to rotate after the rolls 175 and 177 engage a log, the worms 184 will be moved toward the collar 187. This compresses the springs 186, so that said springs will maintain a resilient pressure on the rolls, and at the same time will permit the rolls to move toward and away from each other in conforming to irregularities in the size and shape of the log. The shaft 185 is driven by means of a gearwheel 188, which meshes with the internal gear 159 of the ring member 156. When the center ring member 157 is rotatively moved, the ring member 156 may be moved synchronously therewith, due to the interconnections of the motors 169 and 170, as diagrammatically shown in Fig. 20, and there will be no rotation of the gearwheel 188. However, by separately energizing the motor 169, the ring member 156 may be rotatively moved any desired amount in either direction to rotate the gearwheel 188.

The means for driving all of the rolls 175 and 177 comprises a sprocket wheel 189, fixedly mounted on each of the axles or shafts 176 and 178; two sprocket wheels 190 and 191, rotatively mounted on each transverse shaft 171; and a driving link belt 192 operatively engaging the four sprocket wheels 191, by passing between the two lowermost sprocket wheels 191 and around the outer and upper portions of the two upper sprocket wheels 191 (as shown at the right in Fig. 15) and over a driving sprocket wheel 193 on a shaft 194. An endless link belt 195 operatively connects each sprocket wheel 189 with its corresponding sprocket wheel 190. If the sprocket wheel 193 at the right in Fig. 15 is driven in a clockwise direction, then the several sprocket wheels and rolls will all be rotated in the directions indicated by the arrows. If a log is held between the rolls 175 and 177, when the rolls 175 and 177 are thus rotated, said log will be moved from right to left. If the sprocket wheel 193 is rotated counterclockwise, the log will be moved from left to right. The shaft 194 is journaled in bearing means 195', which is carried by the ring member 157, and the driving means for said shaft 194 comprises bevel gears 194' conecting said shaft 194 with a shaft 196, which is positioned at right angles to shaft 194 and journaled in bearings 197 connected with the ring member 157. A gearwheel 198, on shaft 196, meshes with the internal gear 159 of ring member 155. By operating motor 168, the ring member 155 may be rotated and the gearwheel 198 driven to thereby drive the shaft 194, which drives the rolls 175 and 177.

In the operation of the machine shown in Figs. 15 to 20, the round logs are introduced in any suitable way between the rolls 175 and 177, and the ring members 157 are rotated so as to axially rotate these logs as said logs are being advanced. A tool or rotary cutter head is positioned between the two frame portions 152 and 153 to work on these logs and remove bark, knots and the like therefrom. As the round logs are advanced and axially rotated under the control of the operator, the cutterhead operates in a spiral path on the log to remove the bark therefrom.

A bark removing driven tool may be used in connection with the machine shown in Figs. 15 to 20. One bark removing tool, suitable for this purpose, is shown in a general way, for purpose of illustration, in Figs. 18 and 19, but it will be understood that other types of bark removing tools and also boring and routing tools may be used with the machine shown in Figs. 15 to 20. The bark removing tool shown in Figs. 18 and 19 comprises a concave type rotary cutter head 200 mounted in a bracket 201. The cutter head 200 is connected with a motor 202, by which it is driven. The motor 202 is secured to the bracket 201 and is movable therewith. The bracket 201 is pivotally connected with a frame member 203, preferably by circular track means 204 and by a vertical shaft 205. The frame member 203 is slidably mounted for vertical movement on an upright support 206, by means of vertical track devices 207. Hydraulic lift means 208 is provided for vertically adjusting the frame member 203, and preferably a counterweight 209 is connected with the frame member 203, by cable means 210 passing over sheaves 211. A lever arm 212 is secured to the upper end portion of the shaft 205. A nut 213 is pivotally supported in the outer end portion of the lever arm 212, and a threaded shaft 214, which is connected by universal joint means 214' with motor 215, is threaded through the nut 213.

The slewing motor 215 is mounted on the bracket 203 so that it moves up and down therewith. Operation of the motor 215 will angularly position the cutter head 200. The cutter head 200 is of concave shape, being larger at the ends and smaller at the center. When this cutter head is positioned with its axis at right angles to the axis of a round log, it may be used efficiently to bark a log having a circumferential curvature which conforms to the longitudinal curvature of the cutter head 200. If the concave cutter head 200 is positioned with its axis at an angle to the axis of a log, then said cutter head will conform to the curvature of a log which has a circumferential curvature less than the longitudinal curvature of the cutter head. Thus a log of large diameter, supported by the rolls 175, Fig. 17, may be efficiently barked by positioning the cutter head with its axis at substantially right angles to the axis of the log, as shown by dotted lines, Fig. 17, while the cutter head may be positioned with its axis at an angle to the axis of the log to substantially conform to the curvature of a smaller log. The provision for angularly adjusting the position of the cutter head 200 thus provides a means of adjusting the cutter head to substantially conform to logs of different diameters. Vertical movement of the cutter head is controlled by the hydraulic means 208.

Figure 20:
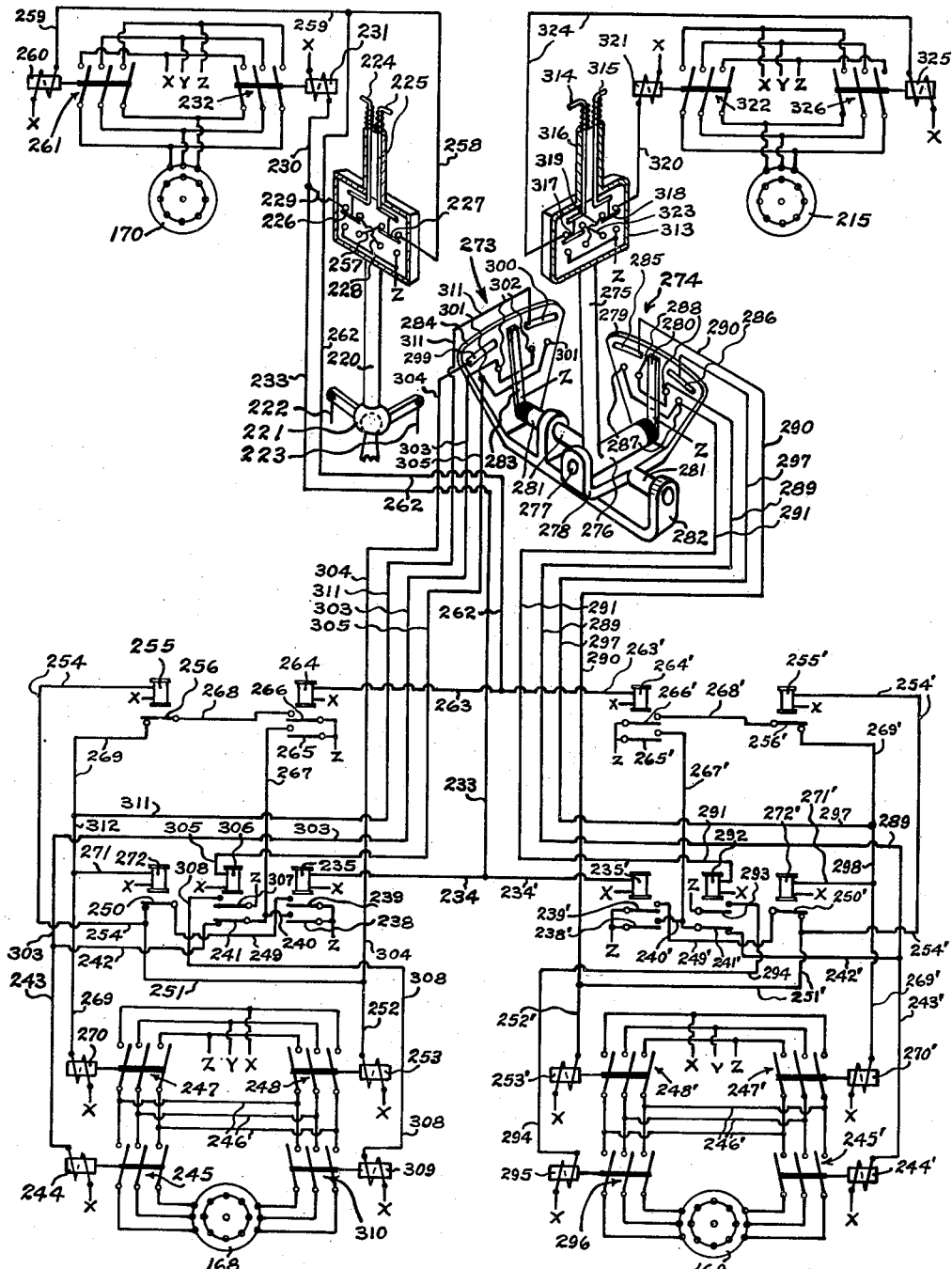
Fig. 20 is a wiring diagram showing the control for the motors shown in Figs. 15–19.

Due to the mechanical connections through the ring members 155, 156 and 157, if the motor 170 (for turning the log) is rotated while motors 168 and 169 remain either stationary, run in the same direction but at a different speed, or are run in a reverse direction, then the rolls 175 and 177 will be moved toward or away from each other, and also the rolls will be driven in one direction or the other. Therefore, if motor 170 is rotated in either direction and it is desired that there shall be no rotation of or movement toward and away from each other of the rolls 175 and 177, then the motors 168 and 169 must rotate in the same direction and at the same speed as motor 170. Also if motor 170 is rotated in either direction and it is desired that there should be rotation of, or movement toward and away from each other of the rolls 175 and 177, then there must be a difference in the relative speed or direction of rotation of the motors 168 and 169 as respects the motor 170. Also it may be desired to rotate the rolls 175 and 177 without any other movement, or it may be desired to similarly move the rolls toward and away from each other. It is, therefore, necessary to have controls so that if the motor 170 is rotated in either direction the motors 168 and 169 will normally rotate in the same direction and at the same speed. It is also necessary to have controls which will permit motors 168 or 169 to be rotated at a different speed, or in a different direction than the motor 170. It is also necessary to have controls which will permit the motors 168 or 169 to run independently of each other at different speeds or in different directions, and also to run independently of the motor 170 regardless of whether or not said motor 170 is running. The various controls necessary for accomplishing these purposes are illustrated in Fig. 20 of the drawings.

The ring 157 supports the feed rolls 175 and 177 and upon rotation of said ring 157 the log or timber supported by said feed rolls is rotated. The motor 170 driving said ring 157 is reversible so that the ring 157 and the log between the feed rolls 175 and 177 may be angularly moved in either direction. As the ring 156, for moving the feed rolls 175 and 177 toward or away from each other, and the ring 155 for providing rotary movement to the feed rolls 175 and 177 and longitudinal movement to a log therebetween, drive through gearing means which rotate with the ring 157, any differential in the angular rotation of the ring 155, as respects the ring 157, will provide rotary movement to the rolls 175 and 177 and longitudinal movement to the timber between said feed rolls, and any differential in the angular rotation of the ring 156, as respects the ring 157, will move the feed rolls 175 and 177 towards or away from each other. Thus I have provided a plurality of rotatively mounted rings 155, 156 and 157; feeding rolls 175 and 177 supported by the ring 157; roll driving means which are connected with the ring 155 and any differential in the relative angular movement between rings 157 and 155 will cause the feed rolls 175 and 177 to be rotated and provide longitudinal movement in one direction or the other to a piece of timber between the feed rolls.

By way of summary, the means for moving the feed rolls 175 and 177 toward and away from each other comprises (see Fig. 17): motor 169, shaft 167 connected with said motor 169, worm and worm wheel means 166 on said shaft 167, shaft 164 (see Fig. 16), gear wheel 161 (see Fig. 15), external gear 158 of ring member 156, ring member 156, internal gear 159 of ring member 156, gear wheel 188, shaft 185 mounting gear wheel 188, worms 184 splined on shaft 185, worm wheel segments 183 carried by upper brackets 173, and brackets 173 pivoted on shafts 171. The outer ends of upper brackets 173 mount feed rolls 175, and such upper feed rolls 175 move toward and away from lower feed rolls 177 upon angular movement of the upper brackets 173 about the shafts 171. Diagonal links 180 are pivoted by pivot means 182 to upper brackets 173 and by pivot means 181 to lever arms 179. Lever arms 179 are rigid with lower brackets 174. Lower brackets 174 are pivoted on shafts 171. Thus lower brackets 174 angularly move with upper brackets 173 and the feed rolls 177 mounted on the outer end of lower brackets 174 move toward and away from upper feed rolls 175 upon angular movement of said lower brackets 174. As the drive means for moving the feed rolls 175 and 177 toward and away from each other includes the gear wheel 188, supported by ring 157, and the internal gear 159 carried by the ring member 156, it is manifest that any relative movement between the rings 157 and 156 will cause relative movement between the internal gear 159 of the ring member 156 and the gear wheel 188 supported by the ring member 157. Any such relative movement between said internal gear 159 and said gear wheel 188 will move the feed rolls 175 and 177 toward or away from each other.

As previously stated, the motors 168, 169 and 170 may be operated independently of each other, each run in either direction, and run at different speeds in either direction, all by means of controls described in connection with Fig. 20. These motors 168, 169 and 170 respectively drive rings 155, 156 and 157 and thus permit synchronous movement of said rings 155, 156 and 157 or relative angular movement between said rings. Ring 157 supports feed rolls 175 and 177 and thus angular movement in either direction of said ring 157, by operation of motor 170, will cause similar angular movement to the feed rolls 175 and 177 and to a log supported thereby.

The means for rotating the feed rolls 175 and 177 in either direction and in turn advancing or retracting logs through the device comprises (see Fig. 17): motor 168, shaft 167 connected with said motor 168, worm and worm wheel means 166 on said shaft 167, shaft 163, gear wheel 160 on said shaft 163 (see Fig. 15), external gear 158 of ring member 155, ring member 155, internal gear 159 of ring member 155, gear wheel 198 on shaft 196 (see also Fig. 16), shaft 196, bevel gears 194', shaft 194, sprocket wheel 193 on shaft 194 (see Fig. 15), link belt 192, sprocket wheels 191 rigid on shafts 171, sprocket wheels 190 also rigid on shafts 171, link belts 195, sprocket wheels 189 fixed on shafts 176 and 178, shafts 176 and 178, and thence to feed rolls 175 and 177 fixed on said shafts 176 and 178. As the gear wheel 198 is mounted for movement with the ring member 157 and such gear wheel 198 meshes with internal gear 159 of the ring member 155, it is manifest that any relative movement between the ring 157 and the ring 155 will provide for rotating the gear wheel 198 and rotate the feed rolls 175 and 177 and thus advance or retract a log through the device.

Referring to Fig. 20 of the drawings, the motor 170 controls the turning of the log. The motor 168 controls the rotation of the rolls 175 and 177 and controls the advancing or retarding of the log through the mechanism. Motor 169 controls the movement of the rolls 175 and 177 toward and away from each other. The motor 215 is the slewing motor or the motor for angularly moving the barker or cutter head 200. The last mentioned motor 215 has been discussed in connection with Figs. 18 and 19 and is subject to independent control, as hereinafter set forth.

Referring to Fig. 20 the motors 168, 169, 170 and 215 are illustrated as three phase motors. The control circuit for operating the various remote controlled or solenoid controlled switches is a single phase circuit. Obviously such type of energy is merely illustrative and is not a limitation upon the invention.

The lever 220 is supported for angular movement in planes at right angles to each other on ball and socket means 221. Movement in one of said planes will cause a link 222, which is connected with the lower end portion of the lever 220, to move up and down and movement in the other plane will cause link 223 to move up and down. The links 222 and 223 are operatively connected with valve mechanism (not shown) to control fluid under pressure to hydraulic cylinders, such as cylinders 64 and 67 of Fig. 4 or cylinder 208 of Fig. 19, or 136 of Fig. 8. Thus a tool, such as 62 of Fig. 4, may be moved up and down as respects a log or moved transversely as respects a log.

Spring loaded plungers 224 and 225 may be depressed to move switch bars 226 and 227 from the normal position shown in Fig. 20 downwardly into electrical connection with the contacts therebelow.

When the plunger 225 is depressed, energy will start in the control circuit from $z$, one side thereof, and pass successively along switch bar 227, conductor 228, switch bar 226, conductor 229, conductor 230, through the solenoid 231 and thence to $x$, the other side of the control circuit. Upon energizing of solenoid 231 the solenoid controlled switch 232 will be closed, establishing electrical connection between the motor 170 and its source of energy represented by conductors $xyz$. The motor 170 will run in a forward direction upon the depressing of plunger 225 and will continue to run as long as said plunger is depressed. Energy on conductor 230 also passes successively along conductor 233, conductor 234, through solenoid 235 to $x$, the other side of the control circuit, and likewise passes from the conductor 233 along conductor 234', through solenoid 235' to $x$, the other side of the control circuit. Upon the energizing of solenoid 235 the switch blades 238 and 239 will be moved to closed position. Energy in the control circuit will then start from $z$, one side thereof, and pass through blade 238 and pass successively along conductor 240, switch blade 241, conductor 242, conductor 243, through solenoid 244, and thence to $x$, the other side of the control circuit. Upon the energizing of solenoid 244 solenoid control switch 245 will be closed, establishing connection between conductors 246 to the low speed windings of the motor 168. The closing of switch 245 will cause motor 168 to operate at low speed and in a forward direction or in a reverse direction, depending upon whether solenoid controlled switch 247 or 248 is closed. The energizing of solenoid 235 causes motor 168 to operate in a forward direction through a circuit next described.

At the same time energy from $z$, one side of the control circuit, passes successively along blade 239, conductor 249, blade 250 (which is normally closed), conductor 251, conductor 252, through solenoid 253 to $x$, the other side of the control circuit. Upon energizing of solenoid 253 solenoid controlled switch 248 is closed, establishing electrical connection between a source of energy $xyz$ and the conductors 246. Closing of the solenoid controlled switch 248 will cause the source of energy $xyz$ to be connected with conductors 246 so that the phase rotation is such that motor 168 will rotate in a forward direction. Thus, upon depressing of the plunger 225 the motor 170 was rotated in a forward direction and at the same time the motor 168, by closing of solenoid controlled switches 248 and 245, likewise rotated in a forward direction and at its low speed, which is the same angular velocity as the forward speed of the motor 170.

Upon depressing of plunger 224, energy from $z$, one side of the control circuit, will pass successively along the switch blade 226, conductor 257, switch blade 227, conductor 258, conductor 259, through solenoid 260, and thence to $x$, the other side of the control circuit. Energizing of solenoid 260 will close solenoid controlled switch 261, establishing electrical connection between the source of energy $xyz$ and the motor 170. The phase rotation will be such that motor 170 will rotate in a reverse direction. Energy along conductor 259 will also pass successively along conductor 262, conductor 263, through solenoid 264 and thence to $x$, the other side of the control circuit. Energizing of solenoid 264 will move the switch blades 265 and 266 into electrically closed position. Energy will then start from $z$, one side of the control circuit, and pass successively along blade 265, conductor 267, along blade 241, conductor 242, conductor 243, through solenoid 244, and thence to $x$, the other side of the control circuit. Energizing of solenoid 244 will close solenoid controlled switch 245 and establish electrical connection between conductors 246 and the low speed winding of motor 168. At the same time energizing of solenoid 264 will establish an electrical circuit where energy from $z$, one side of the control circuit, will pass successively along blade 266, conductor 268, along blade 256 (which is closed as solenoid 255 is not energized) along conductor 269, through solenoid 270 and thence to $x$, the other side of the control circuit. Energizing of the solenoid 270 will close the solenoid controlled switch 247 and establish electrical connection between the source of energy $xyz$ and the conductors 246 so that the phase rotation is such that the motor 168 will rotate in a reverse direction. In view of the fact that solenoid controlled switch 245 is also closed, the motor 168 will rotate in a reverse direction at low speed upon the rotation of motor 170 in a reverse direction. As previously explained, the low speed of the motor 168 will be the same as the speed of rotation of motor 170.

Whenever energy is passing along conductor 269 to close the solenoid controlled switch 247 to rotate motor 168 in a reverse direction, energy will also pass from said conductor 269 along conductor 271 through solenoid 272 and thence to $x$, the other side of the control circuit.

In view of the fact that the electrical connections between conductors 233 and 262 and each of motors 168 and 169 is identical, the parts of the electric circuit to motor 169 are given primed numbers corresponding to the non-primed numbers of the connections to motor 168, and as the description will be identical (except for such primed numbers) to that just described for motor 168 in the interest of brevity it is not repeated.

Thus, whenever motor 170 is operated in a forward direction, connections are established to normally rotate motors 168 and 169 in a forward direction and at slow speed, which will be the same speed of rotation as that of motor 170. Likewise, whenever motor 170 is operated in a reverse direction, electrical connections will be established which will normally rotate motors 168 and 169 in a reverse direction and at slow speed, which will be the same speed of rotation as that of 170.

Whenever energy is passing along conductors 311, 312 and 269 to energize solenoid 270, energy from conductor 269 will pass along conductor 271, through solenoid 272 to $x$, the other side of the control circuit. Energizing of solenoid 272 will move switch blade 250 into open circuit position, thus interrupting energy from $z$, along blade 239, conductor 249, blade 250, conductor 251, conductor 252, through solenoid 253 to $x$, the other side of the control circuit, any time energy is passing along conductor 269 to energize the reverse solenoid 270. This connection to interrupt the circuit to the forward solenoid 253 any time energy is passing along conductor 269 to the reverse solenoid 270 is necessary, as hereinafter explained, in connection with the operation of controllers 273 and 274 so that the normal connection between motors 170 and 168 and 169 may be interrupted and motors 168 and 169 operated independent of motor 170.

Whenever energy is passing along conductors 304 and 252 to energize solenoid 253, energy will pass along conductor 251, along conductor 254, through solenoid 255 to $x$, the other side of the control circuit. Energizing of solenoid 255 will move switch blade 256 into open circuit position, thus interrupting energy from $z$, along blade 266, conductor 268, blade 256, conductor 269, through reverse solenoid 270 to $x$, the other side of the control circuit, any time energy is passing along conductor 252 to energize the forward solenoid 253. This connection to interrupt the circuit to the reverse solenoid 270 any time energy is passing along conductor 252 to the forward solenoid 253 is necessary, as hereinafter explained, in connection with the operation of controllers 273 and 274 so that the normal connection between motors 170 and 168 and 169 may be interrupted and motors 168 and 169 operated independent of motor 170.

Again, in the interest of brevity, as the circuit means to motors 168 and 169 are identical, the solenoids in the circuits to motor 169 are given prime numbers, viz., 255' and 272' and the conductors and switch blades are similarly given primed numbers.

The lever 275 has a hub 276 which is mounted on a pivot shaft 277, journaled in a frame 278. The frame 278 supports a plate 279 formed of insulating material, which plate serves to support the contact members hereinafter described. The contactor 280 is connected with the hub 276 and angularly moves with the lever 275 when the hub 276 is angularly moved as respects the axis of the shaft 277. When such movement of the lever 275 occurs the frame member 278 and plate 279 do not move with the lever, but the contactor 280 moves over the plate 279.

The frame 278 is pivoted on shaft means 281, which is positioned at right angles to the shaft 277 and journaled in a fixed frame 282. A contactor member 283 is fixed with a shaft means 281 so that as the lever 275 is angularly moved, in a plane at right angles to the before mentioned movement, contactor 283 will move therewith. The fixed frame 282 supports a plate 284 of insulating material which is similar to the plate 279 and has contact members, as hereinafter described, and is positioned and supported so that the contactor 283 moves over it when lever 275 is angularly moved on the axis of shaft 281.

The plate 279 is provided with a plurality of contact means thereon which are brushed or contacted by the contactor 280. The contact 285 is a forward contact and the contact 286 is the reverse contact. Interconnected contacts 287 are the high speed contacts of the motor 169 and interconnected contacts 288 are the low speed contacts of the motor 169. If the lever 275 is moved so that the contactor 280 establishes connection with contacts 288 and 285, a control circuit will be established commencing with $z$, one side of the control circuit, to contactor 280, to contact 288 along conductor 289, along conductor 243', through solenoid 244' to $x$, the other side of the control circuit, thus closing solenoid controlled switch 245', thus establishing electrical connection between the conductors 246' with the low speed winding of the motor 169. At the same time another circuit will be energized commencing with z, one side of the control circuit, to contactor 280, to contact 285, along conductor 290, along conductor 252', through solenoid 253' to x, the other side of the control circuit. Energizing of solenoid 253' closes solenoid controlled switch 248' and establishes a phase rotation between the source of energy xyz and the conductors 246' so that the motor 169 will run in a forward direction. We have thus closed switches 248' and 245' so that the motor 169 will operate in a forward direction and at low speed.

If the contactor 280 is moved into electrical contact with a contact 287, the just mentioned circuit closing solenoid controlled switch 248' will be maintained and the circuit to solenoid controlled switch 245' will be interrupted and a high speed circuit will be established commencing with z, one side of the control circuit, to contactor 280, to contact 287, along conductor 291 through solenoid 292 to x, the other side of the control circuit.

Energizing of solenoid 292 will move blade 241' into open circuit position and move blade 293 into closed circuit relation. As blade 293 moves into closed circuit relation a circuit will be established commencing with z, one side of the control circuit, along blade 293, conductor 294, through solenoid 295 to x, the other side of the control circuit. Upon the energizing of solenoid 295 solenoid controlled switch 296 is closed, establishing connection between the conductors 246' and the high speed windings of the motor 169. In view of the fact that switch 248' is already closed, connection will be established between the source xyz and the motor 169 in a forward direction and with the high speed windings of said motor 169.

In view of the fact that the controller 274 is to control the operation of motor 169, irrespective of any normal connections which may be established upon the operation of motor 170, the conductor 251' is connected with conductor 290 and energy flows along conductor 251', along conductor 254', through solenoid 255' to x, the other side of the control circuit, thus moving blade 256' to open circuit position whenever energy is flowing along conductor 290. Opening of blade 256' will interrupt a reverse connection which is started in the event of operation of motor 170 if a forward connection has been established by the controller 274. Also whenever the high speed connection is established and the solenoid 292 is energized, in addition to moving the blade 293 into closed circuit position, the blade 241' is moved into open circuit position—thus the low speed connection which was established when solenoid 235' or 264' was energized through blade 238' and conductor 239' or blade 265' and conductor 267' and thence along blade 241', etc., is interrupted by the opening of blade 241'.

If the contactor 280 is moved in the other direction and establishes contact with contacts 288 and 286, the low speed connection previously described in connection with contact 288 will be established and the solenoid controlled switch 245' closed. Also energy will flow from z, one side of the control circuit, to contactor 280, to contact 286, along conductor 297, conductor 298, conductor 269', through solenoid 270' to x, the other side of the control circuit. Energizing of solenoid 270' will close solenoid controlled switch 247' and establish connection between the energy xyz and the conductors 246' so that the phase rotation is such that the motor 169 will operate in a reverse direction. In view of the fact that switch 245' is closed, the motor will operate at low speed reverse.

Whenever energy is flowing along the conductors 297 and 298, energy will likewise flow along conductor 271' through the solenoid 272' to x, the other side of the control circuit, moving blade 250' into open circuit position, interrupting a forward circuit which would be established upon the energizing of solenoid 235', as previously explained.

If the contactor 280 is moved into contact with contacts 287 and 286, as previously explained, by energizing contact 287, the high speed solenoid controlled switch 296 is closed and also the reverse solenoid controlled switch 247' is closed, thus establishing connection between the source xyz and the high speed windings of the motor 169 so that the motor 169 operates at high speed in a reverse direction. As previously explained, energizing of the high speed contact 287 and conductor 291 will move switch blade 241' to an open circuit position to interrupt any low speed connection which may have been established by reason of the operation of solenoid 264' or 235'.

The plate 284 is provided with a plurality of contact means thereon which are brushed or contacted by the contactor 283. The contact 299 is a forward contact and the contact 300 is the reverse contact. Interconnected contacts 301 are the high speed contacts of the motor 168 and interconnected contacts 302 are the low speed contacts of the motor 168. If the lever 275 is moved so that the contactor 283 establishes connection with contacts 302 and 299, a control circuit will be established commencing with z, one side of the control circuit, to contactor 283 to contact 302 along conductor 303, along conductor 243, through solenoid 244 to x, the other side of the control circuit, thus closing solenoid control switch 245 and establishing electrical connection between the conductors 246 with the low speed winding of the motor 168. At the same time another circuit will be established commencing with z, one side of the control circuit, to contactor 283, to contact 299, along conductor 304, along conductor 252, through solenoid 253 to x, the other side of the control circuit. Energizing of solenoid 253 closes solenoid controlled switch 248 and establishes a phase rotation between the source of energy xyz and the conductors 246 so that the motor 168 will run in a forward direction. We have thus closed switches 248 and 245 so that the motor 168 will operate in a forward direction and at low speed.

If the contactor 283 is moved into electrical contact with a contact 301, the just mentioned circuit closing solenoid controlled switch 248 will be maintained and the circuit to solenoid controlled switch 245 will be interrupted and a high speed circuit will be established commencing with z, one side of the control circuit, to contactor 283, to contact 301, along conductor 305 through solenoid 306 to x, the other side of the control circuit.

Energizing of solenoid 306 will move blade 241 into open circuit position and move blade 307 into closed circuit position. As blade 307 moves into closed circuit position a circuit will be established commencing with z, one side of the control circuit, along blade 307, conductor 308, through solenoid 309 to x, the other side of the control circuit. Upon the energizing of solenoid 309 solenoid control switch 310 is closed, establishing connection between the conductors 246 and the high speed windings of the motor 168. In view of the fact that switch 248 is already closed, connection will be established between the source xyz and the motor 168 in a forward direction and with the high speed windings of said motor 168.

In view of the fact that the controller 273 is to control the operation of motor 168, irrespective of any normal connections which may be established upon the operation of motor 170, the conductor 251 is connected with conductor 304 and energy flows along conductor 251, along conductor 254, through solenoid 255 to x, the other side of the control circuit, thus moving blade 256 to open circuit position whenever energy is flowing along conductor 304. Opening of blade 256 will interrupt a reverse connection which is started by reason of the operation of motor 170 if a forward connection has been established by the controller 273. Also whenever the high speed connection is established and the solenoid 306 is energized in addition to moving the blade 307 into closed circuit position, the blade 241 is moved into open circuit position—thus the low speed connection which was established when solenoid 235 or 264 was energized through blade 238 and conductor 239 or blade 265' and conductor 267 and thence along blade 241, etc. is interrupted by the opening of blade 241.

If the contactor 283 is moved in the other direction and establishes contact with contacts 302 and 300, the low speed connection previously described in connection with contact 302 will be established and the solenoid controlled switch 245 closed. Also energy will flow from z, one side of the control circuit, to contactor 283, to contact 300, along conductor 311, conductor 312, conductor 269, through solenoid 270 to x, the other side of the control circuit. Energizing of solenoid 270 will close solenoid controlled switch 247 and establish connection between the energy xyz and the conductor 246 so that the phase rotation is such that the motor 168 will operate in a reverse direction. In view of the fact that switch 245 is closed, the motor will operate at low speed reverse.

Whenever energy is flowing along the conductors 311 and 312, energy will likewise flow along conductor 271 through the solenoid 272 to x, the other side of the control circuit, moving blade 250 into open circuit position, interrupting a forward circuit which would be established upon the energizing of solenoid 235, as previously explained.

If the contactor 283 is moved into contact with contacts 301 and 300, as previously explained, by energizing contact 301, the high speed solenoid controlled switch 310 is closed and also the reverse solenoid controlled switch 247 is closed, thus establishing connection between the source xyz and the high speed windings of the motor 168 so that the motor 168 operates at high speed in a reverse direction. As previously explained, energy along the high speed contact 301 and conductor 305 will move switch blade 241 to an open circuit position to interrupt any low speed connection which may have been established by reason of the operation of solenoid 264 or 235.

Electrical control means for the slewing motor 215 on the tool which works on the log or slab is provided within a switch housing 313 which is carried by the lever 275. This control comprises two spring loaded switch operating plungers 314 and 315 of push button type reciprocable longitudinally in the handle portion 316 of said lever. Two switch bars 317 and 318 are provided on the lower end portions of the plungers 314 and 315 respectively. A plurality of contacts are provided in the housing 313 and the switch bars 317 and 318 are normally maintained in engagement with predetermined contact members by the spring loaded plungers 314 and 315. Depression of these plungers will close circuits as hereinafter set forth.

When the plunger 314 is depressed, energy will start from z, one side of the control circuit, and pass successively along switch bar 317, conductor 319, switch bar 318, conductor 320 and through solenoid 321 to x, the other side of the control circuit. Upon energizing of solenoid 321 a solenoid controlled switch 322 will be closed, establishing electrical connection between the motor 215 and a source of energy represented by conductors xyz. The motor 215 will run in one direction upon the depressing of plunger 314 and will continue to run in this same direction as long as said plunger 314 is held in a depressed position. When plunger 315 is depressed energy from z, one side of the control circuit, will pass successively along switch bar 318, conductor 323, switch bar 317, conductor 324, and through solenoid 325 to x, the other side of the control circuit. The energizing of solenoid 325 will close a solenoid controlled switch 326 and establish electrical connection between motor 215 and source of energy represented by conductors xyz in a phase relation to cause the motor 215 to run in a reverse direction as long as plunger 314 is maintained in a depressed position. Depression of both of the plungers 314 and 315 at the same time will obviously fail to close any of the control circuits.

The motor 168 which drives the rolls 175 and 177 and the motor 169 for moving said rolls toward and away from each other are both operable at high or low speed in each direction and the motor 170 for turning the log is a reversible motor having the same speed of rotation as the low speeds of the motors 168 and 169. Two speeds are desirable in the motors 168 and 169 so that if a log is to be turned by operating the motor 170 to turn the medial ring 157 in either direction, either or both of the motors 168 and 169 may be simultaneously operated in the same direction as the motor 170 to turn either or both of the rings 155 and 156 in the same direction as the medial ring 157 but at a faster speed. Conversely, reversing either or both of the motors 168 and 169 while the motor 170 continues to run will produce relative rotary movement between one or both ring members 155 and 156 and the medial ring member 157.

The drawings illustrate separate windings in motors 168 and 169 to provide motors with a high speed and a low speed. Such construction is merely illustrative of multiple speed motors and other well known forms of motors to accomplish such purpose may be obviously used.

In the operation of the controls just explained in connection with Fig. 20, the operator stands so that the cutting tool, as 200 in Fig. 19 or 136 in Fig. 8, is readily visible. One hand grasps the handle portion 316 of the lever 275 and the other hand grasps a similar handle portion of a lever 220. The respective thumbs of the operator will be free to depress plunger members 224 or 225 with one thumb or to depress plunger 314 or 315 with the other thumb. By moving the lever 220 angularly in different planes the operator may control the position of the tool, such as 200 in Fig. 19 or 136 in Fig. 8. By the thumb he may depress either plunger 224 or 225 to operate motor 170 in a forward or in a reverse direction. Operation of motor 170 through the control circuit described will provide electrical connections which will normally cause motors 168 and 169 to also operate and at the same speed and in the same direction as motor 170. With his other hand the operator may angularly move the lever 275 in two planes to cause either motor 168 or 169 to operate at the desired speed and in the desired direction, regardless of the operation of motor 170. The operator may also, with the other thumb, depress either plunger 314 or 315 to cause operation of the slewing motor 215 in the desired direction. In actual practice it has been found that the operators soon become accustomed to the controls hereinbefore described, and the piece of wood in the device and the cutting tool can be so synchronized that the operator can remove a defect from a log with an absolute minimum removal of wood. The flexibility of control is well demonstrated by the fact that even unskilled operators are able to carve their initials or like configurations in a piece of wood.

In the foregoing illustrations of this invention each embodiment illustrates a plurality of spaced apart ring members, such as ring members 24 in Figs. 1 to 6, ring members 79 in Figs. 7 to 14, and ring members 155, 156 and 157 in Figs. 15 to 20. Means are provided so that these said rings will be rotated together in the same direction and at the same speed. The ring members carry feeding rolls, such as rolls 33 and 44 of Figs. 1 to 6, rolls 89 and 101 of Figs. 7 to 14, and rolls 175 and 177 of Figs. 15 to 20. The feeding rolls of Figs. 1 to 14 provide for relative movement of the rolls toward and away from each other where all of the movement is taken by one roll of each pair. In Figs. 15 to 20 this movement of the rolls toward and away from each other is provided so that all of the rolls move and a log may be maintained in axial alignment with the rings 155, 156 and 157.

The rolls for supporting the timber are synchronized in their movements to form a common support for a log, so that the log may be advanced or retarded as desired. The rings are synchronized to turn together so that a timber supported by the rolls may be turned to present the desired portion thereof to a tool.

In each embodiment a work station is provided between spaced apart rings which is clear from the operating parts so that all portions of the timber may be presented to a cutting tool throughout the full turning cycle of the timber.

In the various embodiments of this invention a variety of cutting tools have been illustrated, such as the drill 59 shown in Figs. 1 and 2, the cutter 62 shown in Fig. 4, the barking head 63 shown in Fig. 5, the drill or router 136 shown in Fig. 8, and the cutter 200 shown in Figs. 18 and 19. These various tools may be used on each embodiment of the invention and in the interest of brevity all of the tools have not been illustrated with each embodiment and the various tools have been shown as applied to various forms of the invention.

In the various embodiments of this invention the ring members are rotated and rolls are carried by such rotating ring members. The problem of driving the rolls and moving the same toward and away from each other has been illustrated in various ways. For example, in Figs. 1 to 6 the lower rolls 33 are fixed rolls and the upper rolls 44 are spring loaded so that the rolls 44 are urged towards the rolls 33. The timber 32 separates the upper and lower rolls. The lower rolls 33 are driven by motors 42 and a flexible electrical cable means connects these motors with an external source of electrical energy. In Figs. 7 to 14 inclusive the movement of the rolls 89 and 101 toward and away from each other is accomplished by electric motors 127 and 128. In view of the fact that such motors are carried by rotating ring members the external source of electrical energy is connected with such motor through the cable 141, as shown in Fig. 9, or through the slip rings and brushes 140' and 141', shown in Fig. 13. Also the electric motors 95 and 96 for driving the rolls 89 in a forward or a reverse direction to advance or retard the timber, are likewise carried by the rotating ring members. The means for connecting such motors 95 and 96 with an external source of electrical energy is through the same electrical cables 141, shown in Fig. 9, or the slip rings and brushes shown in Fig. 13. In Figs. 15 to 20 inclusive the electric motors are all stationary motors and through the shafts and gears shown the rolls are moved toward and away from each other by the motor 169 and rotated by motor 168. Through the electrical circuit illustrated in Fig. 20 control of the motor 170 for turning the rings and motors 169 and 168 may be properly controlled.

To provide proper manipulation of the controls for the ring members, the feed rolls and the cutting tool, lever members 220 and 275 have been shown in Fig. 20. These lever members permit the operator, by wrist and thumb movement, to properly coordinate the operation of various moving parts of the invention. In other words, various cutting devices have been illustrated and mechanical means are employed to present the desired portion of a piece of wood to the cutting tool. The lever control means are such that the operator may at will present any desired portion of the log and manipulate the cutting tool to engage such desired portion of the log.

Also in the various embodiments of this invention means are provided so that the timber may be supported and presented throughout its entire length for proper engagement with a cutting tool. In other words, the timber need not be supported by rolls on both sides of the work station and it may be supported on either side thereof.

Obviously, changes may be made in the forms, dimensions and arrangement of the parts of this invention, without departing from the principle thereof, the above setting forth only preferred forms of embodiment.

I claim:

1. A device of the class described, comprising frame means; a plurality of axially aligned spaced apart ring members rotatably supported by said frame means; swinging arms pivotally supported by each of said ring members; rolls rotatably mounted in the outer end portions of said arms and positioned to receive therebetween a piece of timber which is to be moved rotatively with the ring members and longitudinally within the ring members; link means interconnecting swinging arms which are positioned on opposite sides of the path of movement of the piece of timber compelling synchronous movement of said interconnected arms toward and away from each other; arm moving means connected with said arms;

and ring member driving means adapted to angularly move the ring members.

2. A device of the class described, comprising two spaced apart cylindrical frame members; a plurality of rings rotatably mounted in each of said frame members; ring rotating means connected with each ring in each frame member; rolls supported by one ring in each frame member and positioned to receive therebetween and support a piece of timber which is to be moved rotatively with the ring by which the rolls are supported and longitudinally within all of the rings; means driven by a second ring for rotating said rolls; and means driven by a third ring for moving said rolls toward and away from each other.

3. A device of the class described comprising two spaced apart cylindrical frame members; three rings rotatably mounted in each of said frame members; ring driving means connected with each of said rings for rotatively moving the same; rolls supported by one ring in each frame member and positioned to receive therebetween and support a piece of timber which is to be moved rotatively with the ring by which the rolls are supported and longitudinally within all of the rings; means actuated by independent rotative movement of a second ring for driving rolls supported by said first mentioned ring; means driven by independent rotative movement of a third ring for moving said rolls toward and away from each other; control means for said ring driving means providing for actuation of the driving means for said second and third rings jointly with the actuation of the driving means for said roll supporting ring and other control means providing for independent actuation of the driving means for said second and third rings.

4. A device of the class described comprising a frame member; a plurality of rings rotatively mounted in said frame member; timber supporting and feeding rolls supported by one of said rings positioned to receive therebetween and support a piece of timber which is to be moved longitudinally; roll driving means connecting said feeding rolls with another ring member and operated by relative angular movement between said first mentioned ring member and said other ring member for longitudinally moving a piece of timber; and independent ring rotating means connected with each ring.

5. A device of the class described comprising a frame member; a plurality of rings rotatively mounted in said frame member; timber supporting and feeding rolls supported by one of said rings and adapted for movement toward and away from each other and positioned to receive therebetween a piece of timber; an internal gear within each of two other of said rings; a pinion meshing with each of said internal gears; a shaft connected with each pinion and carried by said one ring member, each of said shafts rotated by relative angular movement between said one ring member and the ring member carrying the internal gear meshing with the pinion carried by the shaft; roll rotating means connecting said rolls with one of said shafts; roll moving means connecting said rolls with the other shaft adapted to move said rolls toward and away from each other; and independent ring rotating means connected with each ring.

6. A device of the class described comprising a frame member; a plurality of rings rotatively mounted in said frame member; ring driving means connected with each of said rings for independently rotatively moving the rings; arm members pivotally connected with one of said ring members and extending outwardly therefrom on opposite sides of the axis of the ring member; link means operatively connecting opposed arm members compelling movement of the link connected arm members in opposite directions; rolls rotatably supported in the outer end portions of said arm members; and arm moving means operatively connected with said arms and with another ring member and operated by relative rotary movement of said other ring member and said arm carrying ring member to move said arm members on their pivots and thereby move said rolls toward and away from each other.

7. A device of the class described comprising a cylindrical frame member; three rings rotatably mounted in side by side spaced apart relation in said frame member; arms pivotally supported by one of said rings; rolls operatively mounted in said arms; driving means connected with another ring member for driving said rolls; roll moving means connected with said arms and with a third ring for moving said rolls toward and away from each other; three motors having driving connections respectively with said three ring members; control means connected with said three motors for simultaneously energizing said three motors; and other control means connected with two of said motors for energizing said two motors independently of the third motor.

8. A device of the class described comprising a cylindrical frame member; three rings rotatably mounted in side by side spaced apart relation in said frame member; arms pivotally supported by one of said rings; rolls operatively mounted in said arms; driving means connected with another ring member for driving said rolls; roll moving means connected with said arms and with a third ring for moving said rolls toward and away from each other; a single speed reversible motor having a driving connection with the ring which carries the rolls; two reversible two speed motors having driving connections respectively with the roll driving ring and the ring which moves the rolls toward and away from each other; circuit means connected with said motors; control means in said circuit means adapted to simultaneously close circuits to said three motors to rotatively drive said three rings at the same speed and in the same direction; and other control means connected with said circuit means for independently controlling said two reversible two speed motors.

9. A device of the class described, comprising a ring member of a size to receive timbers in the nature of irregular shaped logs therethrough and supported for angular movement about its axis; externally controlled ring member rotating means for selectively angularly moving said ring member in either angular direction; timber supporting and feeding rolls carried by said ring member and mounted for rotary movement and movement toward and away from each other; externally controlled roll rotating means for selectively rotating said rolls in either angular direction and moving a timber supported thereby in either longitudinal direction; and externally controlled roll moving means for selectively moving said rolls toward or away from each other to positively urge said rolls toward or away from each other to follow the contour of an irregular shaped timber, whereby a timber may be selectively angularly and longitudinally positioned and positively engaged and held by feeding rolls to present a desired portion of the timber to a cutting tool.

10. A device of the class described, comprising a plurality of axially aligned ring members of a size to receive timbers in the nature of irregular shaped logs axially therethrough and supported for angular movement about their common axis, said members being spaced apart to provide space therebetween for a driven cutting tool; externally controlled ring member rotating means for selectively angularly and synchronously moving said ring members in either angular direction; timber supporting and feeding rolls carried by each of said ring members and mounted for rotary movement and movement toward and away from each other; externally controlled roll rotating means for selectively rotating said plurality of rolls synchronously in either angular direction and moving a timber supported thereby in either longitudinal direction; and externally controlled roll moving means for selectively moving the rolls supported by each ring member toward or away from each other to positively urge said rolls toward or away from each other to follow the contour of an irregular shaped timber, whereby a timber may be selectively angularly and longitudinally positioned and positively engaged and held by feeding rolls to present a desired portion of the timber to a cutting tool.

11. A device of the class described, comprising a frame member; a plurality of rings rotatively mounted in said frame member; timber supporting and feeding rolls supported by one of said rings positioned to receive therebetween and support a piece of timber which is to be moved longitudinally; feeding roll mounting means mounting said rolls for movement toward and away from each other; driving means for moving said feeding rolls toward and away from each other connected with another ring member and operated by relative angular movement between said first mentioned ring member and said other ring member; and independent ring rotating means connected with each ring.

FREDERICK A. NICHOLSON.